A. T. BLEYLEY.

Churn Dasher.

No. 81,586. Patented Sept. 1, 1868.

WITNESSES.

INVENTOR

United States Patent Office.

A. T. BLEYLEY, OF CONCEPTION, MISSOURI.

Letters Patent No. 81,586, dated September 1, 1868.

IMPROVEMENT IN CHURN-DASHER.

*The Schedule referred to in these Letters Patent and making part of the same.*

TO ALL WHOM IT MAY CONCERN:

Be it known that I, A. T. BLEYLEY, of Conception, in the county of Nodaway, and State of Missouri, have invented a new and useful Improvement in Churn-Dashers; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved churn-dasher, which shall be so constructed and arranged as to bring the butter in a very short time, while, at the same time, it may be used for gathering the butter, and for removing it from the churn.

It consists in the construction and combination of its various parts, as hereinafter more fully described.

A is the body of the dasher, which is made in the shape of an inverted funnel or truncated hollow cone.

To the upper or smaller end of the body A is attached a short pipe, B, for the reception of the dasher-handle, which tightly closes the upper end of the dasher A.

Figure 1:
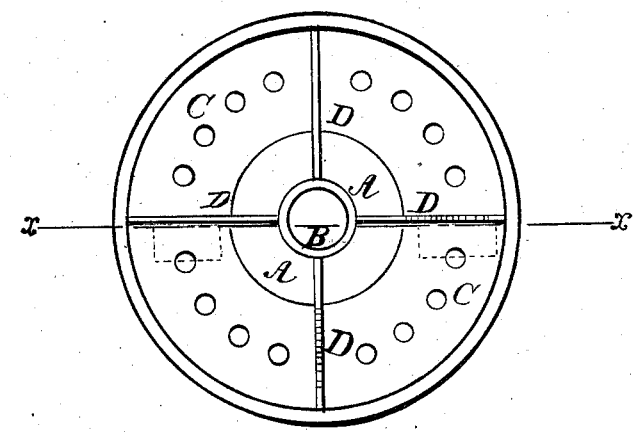
Figure 1 is a top view of my improved churn-dasher.
Figure 2:
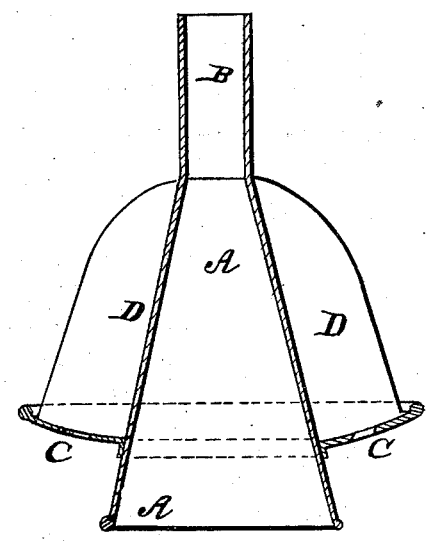
Figure 2 is a vertical section of the same, taken through the line $x\ x$, fig. 1.

To the dasher A, near its lower end, is attached a dish-shaped flange, C, which is perforated with numerous holes, as shown in fig. 1, so as to act as a strainer, in removing the butter from the churn.

D are four wings, attached to the sides of the dasher A, and to the upper side of the flange or strainer C, so as to serve as braces to said strainer.

In using the dasher, the funnel-shaped body A carries the air down into the milk, where it is forced out, and, rising through the milk, throws it into agitation, bringing the butter in a very short time.

The perforated flange C also assists in breaking the cream and bringing the butter. The butter is gathered by the action of the wings D, when the dasher is revolved between the hands of the operator.

When the butter is gathered, it may be removed from the churn by means of the dish-shaped flange or strainer C, the perforations in said flange allowing the buttermilk to flow out, leaving the butter.

Having thus described my invention, I claim as new, and desire to secure by Letters Patent—

As a new article of manufacture, the churn-dasher, consisting of the inverted funnel-shaped tube A B, dish-shaped perforated flange C, and radial wings D, all constructed and arranged to operate as herein shown and described, for the purpose specified.

A. T. BLEYLEY.

Witnesses:
PETER L. MEYER,
JOSEPH PROTZMANN.